United States Patent
Kovacs et al.

(10) Patent No.: US 12,288,868 B2
(45) Date of Patent: Apr. 29, 2025

(54) DISCHARGE STATE ASSEMBLED RECHARGEABLE ELECTROCHEMICAL CELL COMPRIZING METALLIC ELECTRODES

(71) Applicant: BroadBit Batteries Oy, Espoo (FI)

(72) Inventors: Andras Kovacs, Espoo (FI); David Lloyd, Espoo (FI); David Brown, Helsinki (FI)

(73) Assignee: BroadBit Batteries Oy, Espoo (FI)

( * ) Notice: Subject to any disclaimer, the term of this patent is extended or adjusted under 35 U.S.C. 154(b) by 935 days.

(21) Appl. No.: 17/276,753

(22) PCT Filed: Sep. 17, 2019

(86) PCT No.: PCT/FI2019/050663
§ 371 (c)(1),
(2) Date: Mar. 16, 2021

(87) PCT Pub. No.: WO2020/058572
PCT Pub. Date: Mar. 26, 2020

(65) Prior Publication Data
US 2022/0052315 A1    Feb. 17, 2022

(30) Foreign Application Priority Data
Sep. 17, 2018  (FI) .................................. 20185767

(51) Int. Cl.
*H01M 4/134* (2010.01)
*H01M 4/04* (2006.01)
(Continued)

(52) U.S. Cl.
CPC ......... *H01M 4/134* (2013.01); *H01M 4/0471* (2013.01); *H01M 4/1395* (2013.01);
(Continued)

(58) Field of Classification Search
None
See application file for complete search history.

(56) References Cited

U.S. PATENT DOCUMENTS

| 4,797,333 A | 1/1989 | Coetzer et al. |
| 2013/0189602 A1 | 7/2013 | Lahiri et al. |

(Continued)

FOREIGN PATENT DOCUMENTS

| EP | 3 319 163 A1 | 5/2018 |
| EP | 1 779 448 B1 | 6/2018 |

(Continued)

OTHER PUBLICATIONS

Robertson, John O., and George V. Chilingar. "6.3.1.1 Electromotive Force Series." Environmental Aspects of Oil and Gas Production, John Wiley & Sons, Inc., Hoboken, NJ, 2017, pp. 277-279. (Year: 2017).*

(Continued)

*Primary Examiner* — Robert S Carrico
(74) *Attorney, Agent, or Firm* — Merchant & Gould P.C.

(57) ABSTRACT

Rechargeable electrochemical battery cells are disclosed. In particular, are disclosed discharge state assembled rechargeable electrochemical cells, which, when in discharged state, comprises an electrically conductive anodic current collector and a cathode that comprises metallic material as an active material.

17 Claims, 3 Drawing Sheets

(51) Int. Cl.
    *H01M 4/1395* (2010.01)
    *H01M 4/38* (2006.01)
    *H01M 4/66* (2006.01)
    *H01M 4/80* (2006.01)
    *H01M 10/0563* (2010.01)
    *H01M 10/36* (2010.01)

(52) U.S. Cl.
    CPC ............ *H01M 4/38* (2013.01); *H01M 4/661* (2013.01); *H01M 4/662* (2013.01); *H01M 4/808* (2013.01); *H01M 10/0563* (2013.01); *H01M 10/36* (2013.01); *H01M 2300/002* (2013.01)

(56) References Cited

U.S. PATENT DOCUMENTS

| | | |
|---|---|---|
| 2016/0049655 A1 | 2/2016 | Fasching et al. |
| 2016/0336118 A1 | 11/2016 | Majima et al. |

FOREIGN PATENT DOCUMENTS

| | | |
|---|---|---|
| JP | 2000133276 A | 5/2000 |
| JP | 2013199686 A | 10/2013 |
| JP | 2016-103492 A | 6/2016 |
| JP | 2017059367 A | 3/2017 |
| JP | 2017084506 A | 5/2017 |
| JP | 2018073753 A | 5/2018 |
| WO | WO 2016/126610 A1 | 8/2016 |
| WO | WO 2017/075404 A1 | 5/2017 |

OTHER PUBLICATIONS

Machine Translation of JP 2016-103492 A (Year: 2016).*
Office Action dated Oct. 3, 2023 for the corresponding Japanese patent application 2021-514100 (10 pages including English Translation).
International Search Report for International Patent Application No. PCT/FI2019/050663 dated Nov. 19, 2019, 3 pages.
Written Opinion of the International Searching Authority for International Patent Application No. PCT/FI2019/050663 dated Nov. 19, 2019, 6 pages.
Finnish Search Report for Finnish Patent Application No. 20185767 dated Apr. 17, 2019, 2 pages.
Finnish Office Action for Finnish Patent Application No. 20185767 dated Nov. 13, 2020, 5 pages.
Sun, Y. et al., "New preparation method of micron porous copper through physical vacuum dealloying of Cu—Zn alloys", Materials Letters, 165: 1-4 (Nov. 2015).
Communication pursuant to Article 94(3) EPC for corresesponding EP Application No. 19779056.1 dated Jun. 3, 2024 (4 pages).
Office Action dated Oct. 11, 2024 for corresponding Korean Patent Application No. 10-2021-7011392 (25 pages including English Translation).

* cited by examiner

DISCHARGE STATE ASSEMBLED RECHARGEABLE ELECTROCHEMICAL CELL COMPRIZING METALLIC ELECTRODES

This application is a National Stage Application of PCT/FI2019/050663, filed 17 Sep. 2019, which claims benefit of Ser. No. 20/185,767, filed 17 Sep. 2018 in Finland and which applications are incorporated herein by reference. To the extent appropriate, a claim of priority is made to each of the above disclosed applications.

FIELD OF THE INVENTION

The invention relates to rechargeable electrochemical battery cells. In particular, the invention concerns discharge state assembled rechargeable electrochemical cells, which, when in discharged state, comprises an electrically conductive anodic current collector and a cathode that comprises metallic material as an active material.

BACKGROUND

High performance and low cost batteries are advantageous for many applications, e.g. energy storage for electric vehicles or electricity grids. The presently market-leading battery technology is lithium-ion battery technology. The performance of Li-ion batteries has been drastically improving over the past decades, as a result of compounding small annual improvements. At the same time, their production cost has been falling significantly as a result of expanding economies of scale. This is despite the increasing complexity of this technology. Current state-of-the-art batteries employ graphite-based anodes, metal-oxide cathodes, and organic electrolytes. The commercially preferred cathode formulation is based on a nickel-cobalt-manganese oxide (NCM) formulation. However, the future prospects of this cathode formulation are hindered by the limited annual supply of cobalt, which is a known bottleneck for the expected future increase of battery production volumes. The commercially preferred electrolyte formulation is based on a mixture of carbonate solvents with $LiPF_6$ electrolyte salt. However, the high flammability of these solvents present a safety risk, and cause battery fire accidents. Moreover, the low chemical stability of the $LiPF_6$ electrolyte salt restricts the battery operating temperature range, and necessitates complex and costly thermal management of battery packs. An alternative battery technology is required to improve cost and performance.

The present invention aims to solve the above mentioned problems with current state-of-the-art battery cells. The energy density and rate performance of the disclosed invention can be at the same or even higher level as the performance of presently market-leading battery cells, thereby these disclosed improvements do not come at the expense of battery performance.

Moreover, disclosed production technology improvements for this new battery chemistry invention enable simpler and more cost effective production of battery cells. Since the theoretical energy density of the described electrochemical cell may be similar to that of Li-ion technology, a battery pack would comprise a similar number of cells as does currently available Li-ion technology. Therefore, the per-kWh cell manufacturing costs are expected to be substantially lower than current cell production costs. Moreover, the inertness of the electrolytes which may be employed according to the invention is in contrast with Li-ion battery operation, where the electrode-electrolyte interface is stabilized by a passivation layer. Consequently, even after careful optimization, Li-ion batteries are capable of running for only a few thousand cycles. In contrast, cells produced according to certain embodiments of the described invention may have several orders of magnitude longer cycling life, analogous to the cycling life of supercapacitors.

Altogether, the above factors predict the high commercial and technological benefits of the presently introduced battery technology. Consequently, the invention is beneficial to industry and commerce.

SUMMARY OF THE INVENTION

It has been surprisingly found that a rechargeable battery can be constructed by using a metallic material, for instance, a metal foil for the cathode. Moreover it has been surprisingly found that a rechargeable battery can be constructed by using a metallic material, e.g. a metal foil for both electrodes. Moreover, it has been surprisingly found that a rechargeable battery can be constructed by using the same metallic material for both electrodes. Moreover, it has been surprisingly found that a rechargeable battery can be constructed by using copper foil for both electrodes. Moreover, it has been surprisingly found that a rechargeable battery can be constructed by using just porous metal, e.g., copper foil for both electrodes.

According to the invention, a rechargeable electrochemical cell is described. The electrochemical cell may comprise, at least, an anodic current collector, a cathodic current collector and an electrolyte which may be, at least partially, between the cathode and anodic current collectors. The electrochemical cell may further comprise a separator between the cathode and anodic current collector. The electrochemical cell may further comprise one or more charge carriers or current collectors. The electrochemical cell may further comprise a housing. The electrochemical cell may be in charged state, discharged state or an intermediate state.

A discharge state assembled rechargeable electrochemical cell is described. The cell, when in discharged state, may comprise an electrically conductive anodic current collector and a cathode that comprises metallic material as an active material. Metallic material may be the main active material. Metallic material may be the only active material. The metallic material may be a metal. The metal may be essentially pure metal. The essentially pure metal may be of a single metal or of a mixture or alloy or compound of essentially pure metals. The essentially pure metal may comprise a metal dopant. The cathode of the electrochemical cell may be in contact with an electrically conductive cathodic current collector or all or part of the cathode may also act as an electrically conductive cathodic current collector. A metallic deposit may be formed on and/or in the anodic current collector during charging. The metallic deposit may be solid. A salt may be formed, at least in part, from the cathode (i.e. the cathode and/or the cathode material, for instance, the active material of the cathode) during charging. The anodic current collector and cathode may comprise essentially the same material (which may include the same combination of materials and/or ratio and/or state or form of materials). The anodic current collector and/or the cathode may be doped. The dopant may be by any material. The dopant may be metallic. The dopant may be a metal. The dopant may be an essentially pure metal. The anodic current collector and/or cathode may comprise copper. The anodic current collector and/or cathode may comprise copper and a metal dopant. The anodic current collector and/or cathode may comprise metallic copper. The anodic current collector and/or cathode may comprise metallic copper and a metal dopant. The metallic copper may be essentially pure metallic copper. The cathode and/or anodic current collector may comprise a zinc dopant. The cathode and/or anodic current collector may comprise essentially pure metallic copper and zinc dopant. The cathode and/or anodic current collector may comprise metallic copper or essentially pure metallic copper and a dopant when in discharge state. The cathode and/or anodic current collector may comprise metallic copper and a zinc dopant when in discharge state. The cathode and/or anodic current collector may comprise essentially pure metallic copper and a dopant when in discharge state. The dopant may be a metallic dopant. The dopant may be a metal dopant. The dopant may be a zinc dopant. An ion-exchange structure (e.g. a membrane, film or separator) may be situated between the anodic current collector and cathode. The ion-exchange structure may be an anion-exchange membrane. The ion-exchange structure may prevent transfer of cations contained in the metal salt formed at the cathode and/or may allow selective transport of alkali metal cations or anions. The cathode and/or the anodic current collector may be porous. The cathode and/or anodic current collector may be made porous by evaporation of one or more elements from a metallic mixture and/or alloy. The cathode and/or anodic current collector may be made electrochemically active by, for instance, introducing one or more electrochemically active materials to said cathode and/or anodic current collector. The polarity of the cell may be reversed so that the cathode may become the anodic current collector and the anodic current collector may become the cathode. The electrochemical cell may be used in a battery pack. The electrochemical cell and/or the battery pack may be used in a device.

Here metallic material means material having electric conductivity greater than approximately $1 \times 10^5$ σ(S/m) at 20° C. Examples of metallic materials include materials that have electrons in 3-dimensional delocalized state. Examples of metallic materials may include metals. Examples of metals may include Hg, Dy, Eu, Ce, Er, Ho, La, Pr, Tm, Nd, Y, Sc, Lu, Po, Am, Ti, Zr, Sb, Fr, Ba, Hf, As, Yb, U, Pb, Cs, V, Pa, Re, Tl, Th, Tc, Ga, Nb, Ta, Sr, Cr, Rb, Sn, Pd, Pt, Fe, Li, Os, In, Ru, Cd, K, Ni, Zn, Co, Mo, W, Ir, Na, Rh, Mg, Ca, Be, Al, Au, Cu, Ag and any mixtures, alloys or combinations thereof. Metallic materials may include allotropes of carbon. Allotropes of carbon include diamond, graphite, graphene, amorphous carbon, fullerenes, carbon nanotubes, carbon nanobuds and glassy carbon, carbon nanofoam, lonsdaleite, linear acetylenic carbon or any other allotrope of carbon and/or any combination thereof. Other metallic materials are possible according to the invention.

The electrochemical cell of the invention may be a rechargeable electrochemical cell. The electrochemical cell may comprise a cathode that comprises metallic material as an active material in discharged state. The cell may comprise essentially purely metallic electrodes when the cell is in discharged state. The cell may be assembled in discharged state. The anode and cathode of the electrochemical cell may comprise the same metal or metal alloy or different metals or metal alloys. The anode and cathode of the electrochemical cell may have the same composition. The anode and/or cathode of the electrochemical cell may comprise metallic copper in the discharged state. The anode and/or cathode of the electrochemical cell may comprise essentially pure metallic copper in discharged state. The anode and/or cathode of the electrochemical cell may be essentially pure copper. The electrodes of the electrochemical cell may be separated by one or more ion-exchange structures. One or more of the ion-exchange structures may also act as the separator. The one or more ion-exchange structures may be in addition to the separator. The ion-exchange structure may be combined with the separator. The ion-exchange structure may be on the anode and/or the cathode side of the separator.

The anode and/or cathode may be produced by any means known in the art. The anode and/or cathode may be produced by heat-treating precursor metal foils. The heat treatment may be vacuum heat treatment. The heat treatment may produce porous metal foils and/or metal foams. Said porous foils and or foams may have high gravimetric surface area. High gravimetric surface area here means preferably greater than 0.1 $m^2$/g and more preferably greater than 1 and most preferably greater than 10 $m^2$/g. Either of or both the anodic current collector and/or the cathode of the cell may be a heat-treated metal foil.

The foil may be made of a common industrial metal. The industrial metal foil may be a brass foil as input material for the anodic current collector and/or cathode making. The brass input foil may produce or be reduced to a porous copper foil upon heat treatment. One may assemble the cell using said foil for both the anodic current collector and/or the cathode. Said construction, thereby creates a simple and cost effective rechargeable metal-metal battery.

The employed metal may be structured into a microporous foam in one or both electrodes. The electrode metal may be copper or any other suitable metal. In the anode side, metallic deposition may happen on surface of the current collector metal. The deposition may be sodium metal or any other suitable metal. Using a microporous foam structure, may ensure that the deposited metal, e.g. the sodium, stays within the electrode structure, avoiding variable electrode-position growth toward the other electrode, and/or avoiding the detachment of metal, e.g., sodium, pieces during discharge. In the cathode side, the conversion of metallic cathode material, e.g., the copper, to a metal salt, e.g. $CuBF_4/CuBH_4$ salt, may happen on surface of the cathodic metal, e.g. the cathodic copper, and the solubility of this salt may allow the conversion to proceed without passivating the electrode surface. Using a microporous foam structure, may ensure a good power capability and/or create the space for the deposition of the cathodic salt, e.g., several embodiments of the invention, the CuI, $CuBF_4$ and/or $CuBH_4$ salt, which may be significantly less dense than cathode metal, e.g. the copper.

Porous electrode production can be achieved in a number of ways. In a preferred method, a multi-component foil, for instance, in the case of producing a porous copper foil, a brass foil, may be used as input material, and is placed into a heating device, e.g. a furnace, for instance, a vacuum furnace. Upon heat treating at a temperature which evaporate, degrades, reacts or otherwise removes, at least one component, for instance Zn in the case of brass, of the foil, a porous foil may be obtained, for instance, a porous copper foil, which can be directly employed as the anodic current collector and/or cathode for the battery assembly. In some cases, it may be advantageous to adjust the process to retain a small percentage of removed material for doping the electrode, for instance, in the case of a brass foil, some small amount, e.g. preferably below 50%, and more preferably below 25%, and more preferably below 12% and more preferably below 5% and most preferably below 2% of the original Zn, for doping in the electrode. These doped, e.g. Zn, sites may serve to seed the metal, e.g. sodium, electrodeposition, thereby promoting more uniform surface coverage. Other dopants and methods of incorporating dopants in the electrode are possible according to the invention. Other multi-component foils are possible to use as precursor foils according to the invention. In one embodiment of the invention, the multi-component foil consists of at least one element that is not substantially removed (e.g. evaporated or etched away) under the treatment, e.g. the heat treatment) and at least one element that is, at least partially, removed, e.g. evaporated, under treatment, e.g. heat treatment.

The electrolyte of the electrochemical cell may remain essentially fully inert in the entire course of the battery cycling.

In this context, in the preferred embodiment, the described metal-metal battery technology uniquely combines several advantages:

Heat-treated metal foils represent a quantum-leap manufacturing simplification over the current electrode production process.

All chemicals comprising the battery cell are abundant and cost-effective.

The described battery technology can be easily scaled up to any production volume.

Because of the anticipated high battery longevity, the life-cycle cost of the battery cell is significantly improved and longevity requirements are better fulfilled.

A discharge state assembled rechargeable electrochemical cell according to the invention is described, which, when in discharged state, may comprise only an electrically conductive anodic current collector as an anode. The electrochemical cell may comprise a cathode that comprises only metallic material as the active material when in discharge state. A solid metallic deposit may be formed on and/or in the anodic current collector during charging. According to the invention, the metallic material may be a metal. The metal may be a transition metal, an alkaline earth metal, a lanthanide and/or a post-transition metal and/or a group 2, a group 3, a group 4, a group 5, a group 6, a group 7, a group 8, a group 9, a group 10, a group 11, a group 12, a group 13, a group 14, a group 15 and/or a group 16 element. 16.

A cathode for an electrochemical cell is described, wherein the cathode is porous and comprises only metallic material as the active material and a dopant.

A method for producing a porous electrode or current collector for an electrochemical cell is described involving the steps of:

a. introducing a multi-component metal foil into a heating device;

b. heating the foil in the heating device to a temperature which evaporates, degrades, reacts or otherwise fully or partially removes, at least one metal component of the multi-component metal foil.

DETAILED DESCRIPTION OF THE EMBODIMENTS

Detailed embodiments of the present invention are disclosed herein with reference to accompanying drawings.

The electrochemical cell of the invention may be a rechargeable electrochemical cell. Here, rechargeable means that it is able to be charged and discharged multiple times. The electrochemical cell may be assembled in discharge state. Here discharged state assembly means that the cell maintains no or negligible voltage potential or electrical current between the anodic current collector and cathode when assembled. A cell may be returned to discharge state or a state close to discharge state after it has been charged by discharging the cell such that the cell no longer maintains a non-negligible current or voltage between the anodic current collector and cathode.

The cell, when in discharged state, may comprise an electrically conductive anodic current collector and a cathode that comprises metallic material as the active material. The anodic current collector and/or cathode may be a metallic cathode and/or anodic current collector. The anodic current collector and/or cathode may be a metal cathode and/or anodic current collector. The anodic current collector and/or cathode may be an essentially pure metal or metallic cathode and/or anodic current collector. Here electrically conductive means having a conductivity preferably higher than $1 \times 10^1$ S/m and more preferably greater than $1 \times 10^3$ S/m and more preferably greater than $1 \times 10^5$ S/m and most preferably greater than $1 \times 10^7$ S/m. Here essentially pure metal means that greater than 50% or, more preferably, greater than 75% or, more preferably, greater than 85% or, more preferably, greater than 90% or, more preferably, greater than 95% or, more preferably, greater than 98% or, most preferably, greater than 99% of the material is metallic and/or that greater than 50% or, more preferably, greater than 75% or, more preferably, greater than 85% or, more preferably, greater than 90% or, more preferably, greater than 95% or, more preferably, greater than 98% or, most preferably, greater than 99% of the atoms of the material are in the zero oxidation state. When in charged or semi-charged state, some or all of the metallic cathode material may be converted to a salt of the metal.

The anode and/or the cathode of the electrochemical cell may be in contact with an electrically conductive cathodic current collector. The material of the anodic and/or cathodic current collector may be any suitable conductive material. Said material may allow the movement of electrons and/or holes through the material. The contact between the cathode and cathodic current collector may be ohmic. The contact may be, for instance, by bonding or by compression. The bonding may be, for instance, chemical, mechanical or by any other form of bonding. All or part of the andode and/or cathode may also acts as an electrically conductive anodic and/or cathodic current collector. A metallic deposit may be formed on and/or in the anodic current collector during charging. The metallic deposit may be formed from elements of or in the electrolyte. The metallic deposit may be formed by, for instance, electro-deposition and/or reduction. A salt may be formed, at least in part, from the cathode (i.e. the cathode and/or the cathode material) during charging. All or part of the cathode may be converted to a salt during charging. During charging, the salt may be formed from elements of the cathode and/or elements of or in the electrolyte. The salt may be formed by, for instance, chemical reaction. The salt may be formed by electrochemical reaction. The salt may be formed by oxidation. During discharge, the metal may be stripped from the anodic current collector. The stripping may be by chemical reaction. The stripping may be by electrochemical reaction. The stripping may be by oxidation reaction. During discharge, the salt may be fully or partially removed from or converted in the cathode. During discharge the salt may be converted back to metal. The removal and/or conversion may be by chemical reaction. The removal and/or conversion may be by electrochemical reaction. The removal and/or conversion may be by chemical reduction. Herein, deposits (e.g. electrodeposits) and products of conversion (e.g. conversion of pure metals into salts) are generally termed formations.

The cathode and/or the anodic current collector may be porous. Here porous means having a void space regarding cathode material and/or anodic current collector material of greater than 10% and more preferably greater than 20% and more preferably greater than 50% and most preferably greater than 75% by volume. The cathode and/or anodic current collector may be made porous or manufactured to be porous by any means known in the art, including but not limited to, etching or sintering. One particularly cost effective means is by evaporation of one or more elements from a metallic mixture and/or alloy. In such a case, one element to be evaporated has a lower melting and/or boiling point or higher vapor pressure than the material to be retained in the foil (i.e. the anodic current collector material and/or cathodic material), such that, upon heating, the element to be evaporated is fully or partially removed from the foil, leaving behind porous anodic current collector material and/or cathodic material.

The anodic current collector and cathode may comprise essentially the same material (which may include the same combination and/or ratio and/or state or form of materials). The anodic current collector and/or cathode may comprise metallic copper. The cathode and/or anodic current collector may comprise essentially purely metallic copper. The cathode and/or anodic current collector may comprise porous copper. The cathode and/or anodic current collector may comprise doped copper. The dopant may be any metal. The dopant may be zinc.

The cathode and/or anodic current collector may be made electrochemically active by, for instance, introducing one or more electrochemically active materials to said cathode and/or anodic current collector. The electrochemically active material may be introduced by any means known in the art, including but not limited to, sputtering, CVD, electro-deposition, alloying, chemical reaction, bombardment, coating, or by any other means known in the art.

Figure 1:
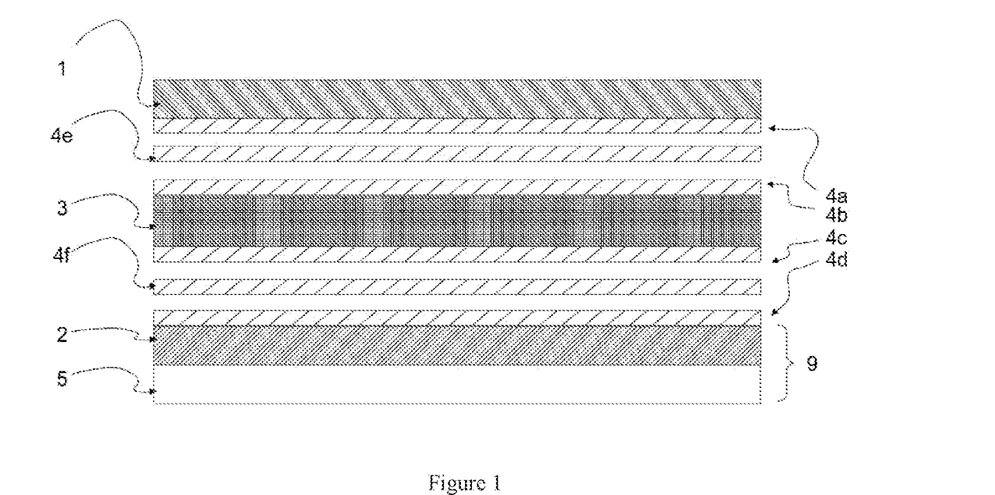
FIG. 1: Schematic of a cross-section of an electrochemical cell according to one embodiment of the invention in discharge state.

An embodiment of an electrochemical cell according to the invention as assembled in discharge state is described in FIG. 1 (showing a schematic of the cell stack in cross-section). Here, the discharge state electrochemical cell may comprise, at least, an anodic current collector (1) and a cathode (2). The anodic current collector (1) can also be termed the discharge state anode. The cathode (2) and/or the anodic current collector (1) may act as deposition/formation/reaction substrate and/or matrix (here termed a substrate). The cell may also comprise a cathodic current collector (5). Together, the cathode (2) and the cathodic current collector (5), if present, are termed the cathode stack (9).

All or part of the anodic (1) and/or cathodic (5) current collectors and/or cathode (2) and/or the cathode stack (9) may be electrically conductive. The anodic (1) and/or cathodic (5) current collectors and/or cathode (2) and/or the cathode stack (9) may comprise a conductive material. The anodic (1) and/or cathodic (5) current collectors and/or cathode (2) and/or the cathode stack (9) may comprise a non-conductive material and a coating and/or additive. The anodic (1) and/or cathodic (5) current collectors and/or cathode (2) and/or the cathode stack (9) material and/or coating and/or additive may be electrically conductive and/or electrochemically active. The anodic (1) and/or cathodic (5) current collectors and/or cathode (2) and/or the cathode stack (9) may be made conductive and/or electrochemically activated, for instance, by the coating (e.g. spray, dip, CVD or ALD), deposition (e.g. electrodeposition or sputtering), impregnation, reaction or by any other means known in the art. The anodic (1) and/or cathodic (5) current collectors and/or cathode (2) and/or the cathode stack (9) may comprise a metal, a mixture of metals and/or an alloy. The anodic (1) and/or cathodic (5) current collectors and/or cathode (2) and/or the cathode stack (9) may act as a metal and/or salt deposition/formation substrate and/or matrix during charging and/or discharging. The anodic current collector (1) may act as an electroplating substrate. The cathodic current collectors (5) and/or cathode (2) and/or the cathode stack (9) may act as a salt deposition/formation substrate. The cathode (2) and cathodic current collector (5) may be one in the same.

Figure 2:
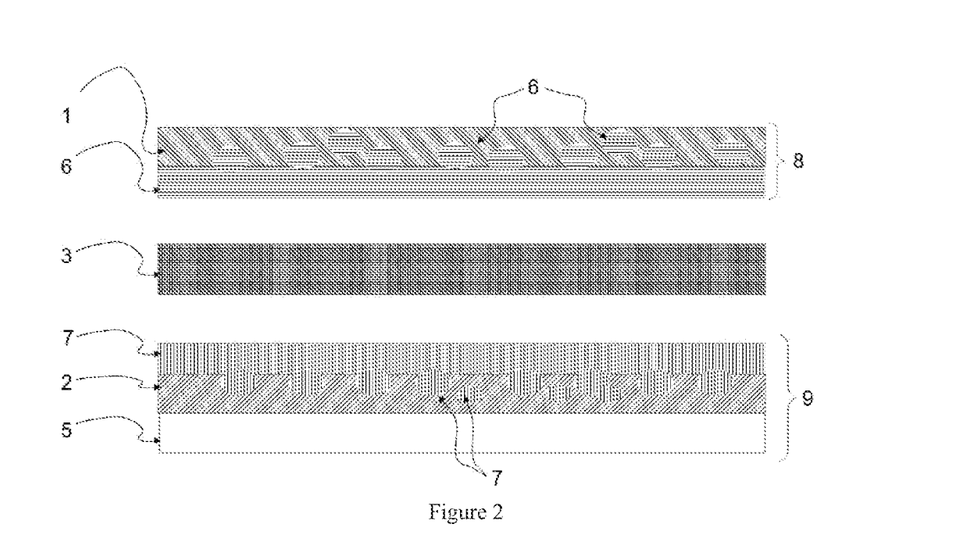
FIG. 2: Schematic of a cross-section of an electrochemical cell according to one embodiment of the invention in charge state.

As shown in FIG. 2, during charging, formations (6, 7) may form on and/or in the cathode and/or anodic current collector. The formations may be, for instance, a metal and/or a salt. The combination of an anodic current collector (1) and any formation (6) is here termed an anode (8). The combination of a cathode, a cathodic current collector (if present) and a formation (7) (i.e. a charged or semi-charged cathode) is here still termed a cathode (2). The cathode (2) and cathodic current collector (5) together are the cathode stack (9). Collectively, the anode (8) and cathodic stack (6) are the electrodes.

Figure 3:
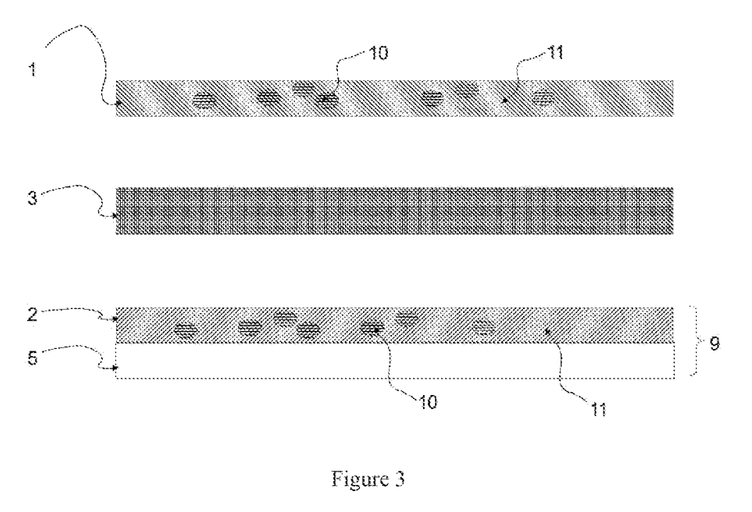
FIG. 3: Schematic of a cross-section of an electrochemical cell according to one embodiment of the invention having a multi-component anodic current collector and/or cathode.

As shown in FIG. 3, according to one embodiment of the invention, the anodic current collector (1) and/or the cathode (2) may comprise a metallic material (10), e.g. a pure metal and another dispersing material (11). The metallic material (10) in the anodic current collector (1) and/or cathode (2) may be dispersed in a matrix, mixture or compound (here collectively termed a dispersion). The dispersion may comprise a non-active dispersing material (11). The non-active material may be conductive. The non-active dispersing material may be essentially inert to the electrolyte and/or the components dissolved therein and/or the non-active dispersing material may not electrochemically participate in the operation of the cell. The non-active dispersing material may be a polymer and/or a carbonaceous material. The polymer and/or carbonaceous material may be a conductive polymer and/or carbonaceous material. The conductive polymer may be, for instance, Poly(fluorene), a polyphenylene, a polypyrene, a polyazulene, a polynaphthalene, a poly(pyrrole) (PPY), a polycarbazole, a polyindole, a polyazepine, a polyanilines (PANI), a poly(thiophene) (PT), a poly(3,4-ethylenedioxythiophene) (PEDOT), a poly(p-phenylene sulfide) (PPS), a Poly(acetylene)s (PAC), a poly(p-phenylene vinylene) (PPV), a polyaniline nanofibers, PEDOT:PSS and/or any other conductive polymer and/or mixture thereof. The carbonaceous material may be an allotrope of carbon. The allotrope of carbon may be, for example, diamond, graphite, graphene, graphenylene, amorphous carbon, fullerenes, carbon nanotubes, carbon nanobuds, schwarzites, glassy carbon, carbon nanofoam, lonsdaleite, linear acetylenic carbon or any other allotrope of carbon and/or any combination thereof. The dispersion may comprise a binder. The anodic current collect (1) and the cathode (2) may contain the same or different metallic material (10). The anodic current collect (1) and the cathode (2) may contain the same or different dispersing material (11).

As shown in FIGS. 1, 2 and 3, The electrochemical cell may comprise a spacer and/or separator (3), here termed a spacer. The separator (3) may serve to prevent contact and/or shorting between the anode (8) and/or the anodic current collector (1) and the cathode (2) and/or the cathodic current collector (5) and/or the cathode stack (9). The separator (3) may physically separate the anode (8) and/or the anodic current collector (1) and the cathode (2) and/or the cathodic current collector (5) and/or the cathode stack (9). The separator may serve to block dendrite formation between the anode (8) and/or the anodic current collector (1) and the cathode (2) and/or the cathodic current collector (5) and/or the cathode stack (9). Electrodes of the electrochemical cell may be separated by one or more separators. The separator may act as a substrate or support for another component of the cell. The separator may act as an ion-exchange structure or a support for an ion-exchange structure.

As shown in FIG. 1, the electrochemical cell may comprise one or more ion-exchange structures (4a-f). An ion-exchange structure may be situated between the the anode (8) and/or the anodic current collector (1) and the cathode (2) and/or the cathodic current collector (5) and/or the cathode stack (9). The separator (3) may comprise one or more ion-exchange structures (e.g. 4b and/or 4c). One or more ion-exchange structures (4a and/or 4d) may also be attached or incorporated in and/or on the anodic current collector (1), the anode (8), the cathode stack (9) and/or the cathode (2). Ion-exchange structures (4a-f) may be also unattached and/or incorporated into any of the anodic current collector (1), the anode (8), the cathode stack (9), cathode (2) or separator (3). The ion-exchange structure and separator may be combined as the same structure (not shown). Electrodes of the electrochemical cell may be separated by one or more ion-exchange structures (4a-f). One or more of the ion-exchange structures (4a-d) may also act as the separator (3). The one or more ion-exchange structures (4a-f) may be in addition to the separator. (3) The ion-exchange structure (4a-f) may be combined with the separator (3). The ion-exchange structure (4a-f) may be attached to, deposited on or otherwise integrated with the separator (3). The ion-exchange structure (4a-f) may be inside of and/or on the anode and/or on the cathode side of the separator (3). The ion-exchange structure may be, for instance, sodium beta-alumina, anion-exchange membranes based on, for instance, ionomers, cation-exchange membranes, for instance, Nafion, or any other material and/or structure that facilitates selective transport of cations and/or anions present in the electrolyte. According to the invention 0, 1, 2, 3, 4 or more ion-exchange structures may be present.

The electrochemical cell may comprise an electrolyte. The electrolyte may be, at least partially, between the anode (8) and/or ionic current collector (1) and the cathode (2) and/or the cathodic current collector (5) and/or the cathode stack (9). The electrolyte may comprise anodic material and/or cathodic material. The electrolyte may remain essentially inert in the entire course of the battery cycling. The electrolyte may comprise an organic or inorganic solvent.

The electrolyte may comprise, for instance, an $SO_2$ solvent or an $NH_3$ solvent. Other solvents are possible according to the invention.

The polarity of the cell may be reversed so that the cathode (2) may become the anodic current collector (1) and the anodic current collector (1) may become the cathode (2). The cell may be essentially symmetric in discharged state or non-symmetric in discharged state. Reversing the polarity of the cell may be used as a means to regenerate the cell. Here regeneration means to return a degraded cell to a state closer to its original assembly state and/or performance. The polarity of the cell may be reversed while the cell is in discharged state.

An electrochemical cell may further comprise a housing. The electrochemical cell may be used in a battery pack. The electrochemical cell and/or the battery pack may be used in a device.

The cell may be assembled in charged state, semi-charged state or discharged state. Most preferably, the cell is assembled in discharged state. The anodic current collector and cathode of the electrochemical cell may comprise the same or different metal or metal alloy. The anodic current collector and cathode of the electrochemical cell may have the same or different composition. The anodic current collector and cathode may have the same or different porosity. The anodic current collector and cathode of the electrochemical cell may comprise copper. The anode and cathode of the electrochemical cell may be essentially pure copper.

EXAMPLES

In one embodiment of the invention, in the discharged state, a metal-metal battery comprises essentially pure copper metal in both the anode and cathode, though other metals, alloys, mixtures or combinations of conductive materials (e.g. metals (e.g. transition metals), conductive polymers, conductive nanomaterials, such as carbon nanomaterials (such as CNTs, CNB, graphene etc.)) are possible according to the invention. In said embodiment, on the anode side, metallic sodium is deposited onto the copper surface (i.e. into the copper foam's pores) during charging, though other metals (e.g. alkali metals) are possible according to the invention. In one embodiment, on the cathode side, metallic copper is converted into $CuBF_4$ and/or $CuBH_4$ (depending on the electrolyte salt composition) during charging. In one embodiment copper is converted to CuI. The reverse process takes place during discharge.

According to one embodiment of the invention, the electrochemical cell comprises highly concentrated sodium salts in ammonia solvent. Three electrolyte variants were tried: $NaBH_4 \times 1.5NH_3$, $NaBF_4 \times 2.5NH_3$ and $NaI \times 3.3NH_3$ Other electrolytes are possible according to the invention. Other molar ratios between the salt and the solvent are possible according to the invention. The following are unique properties of the $NaBH_4 \times 1.5NH_3$, $NaBF_4 \times 2.5NH_3$ electrolytes:

Their ionic conductivity is an order of magnitude higher than the conductivity of the best organic Li-ion battery electrolytes, At a given anodic overpotential, the metallic sodium deposition/stripping speed is an order of magnitude higher than in any known organic solvent, They allow non-dendritic sodium deposition over copper substrates, The electrolyte is inert against electrodeposited sodium, thus, there is no anodic SEI, The electrolyte voltage window is approximately 3 V against sodium and, thus, it remains fully inert also on the cathode side when 2.5-3 V charging limit is employed.

Ammonia is at least an order of magnitude cheaper than the organic solvents employed for Li-ion batteries, and the $NaBH_4/NaBF_4$ salts are also significantly cheaper than the $LiPF_6$ salt employed for Li-ion batteries.

The $NaBF_4 \times 2.5NH_3$ composition stays liquid down to −40° C.

The $NaBH_4 \times 1.5NH_3$ electrolyte variant allows to reach higher energy density, while the $NaBF_4 \times 2.5NH_3$ electrolyte variant represents better cost efficiency. Altogether, the above electrolyte characteristics form a unique basis for its use in a metal-metal battery, the invention is not limited to said tested electrolytes.

Figure 4:
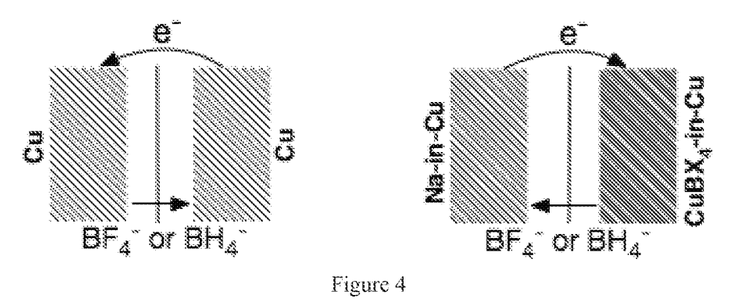
FIG. 4: Schematics of a metal-metal cell according to one embodiment of the invention (left side shows charging).

A 2V rechargeable battery operation with the described porous copper anodic current collector and cathode and electrolyte materials has been achieved. Its theoretical energy density was found to be similar to that of the present-day Li-ion batteries. FIG. 4 schematically illustrates the battery operation. The battery is assembled in discharged state, with porous copper electrodes on both sides. In the case of $NaBH_4/NaBF_4$ salts, in the charged state, the anode pores are filled by electrodeposited sodium, while, in the cathode pores, copper is converted to $CuBF_4$ and/or $CuBH_4$. In the case of NaI salts, in the charged state, the anode pores are filled by electrodeposited sodium, while, in the cathode pores, copper is converted to CuI.

Figure 5:
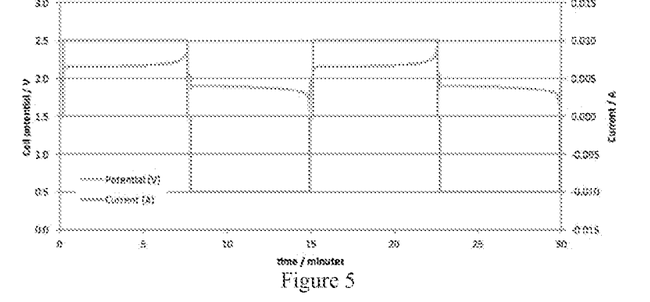
FIG. 5: Operating voltage of the two electrodes against a Na reference according to one embodiment of the invention. The left side shows the anode voltage evolution during sodium deposition/stripping, and the right side shows the cathode voltage evolution during two representative charge-discharge cycles.

FIG. 5 shows the voltage evolution of these two electrodes in one of the described ammonia based electrolytes, relative to the sodium reference. This data demonstrates that in our electrolyte copper stays in the +1 valence state upon charging, and that the cell yields a flat discharge plateau at nearly 2 V.

Since the $CuBF_4$ or $CuBH_4$ salts, which are produced in the cathode upon charging, have some solubility in the electrolyte, for optimal operation, they should be prevented from cross-over. An anion exchange membrane can be, therefore, employed between the two electrodes. In the described examples, this membrane allows the passage of $BF_4-$ or $BH_4-$ anions only, while blocking the passage of certain other components of the electrolyte, which counterbalance the electrons transferred over the external circuit. For other embodiments of the invention, the anion exchange membrane should allow the passage of different ions and block the passage of other components of the electrolyte. Such variations are completely within the scope of the described invention.

In one embodiment of the invention, Fumatech membrane, which is saturated with $BF_4-$ or $BH_4-$ via an anion exchange process, is employed. Other membranes, both for the filtration of $BF_4-$ or $BH_4-$ or for ions appropriate for other embodiments of the invention are possible according to the invention.

In one embodiment of the invention, a brass foil has been vacuum heat treated to produce a copper foam surpassing the required gravimetric surface area size threshold for efficient electrodeposition and oxidation on the anode and cathode sides respectively. A brass foil (63 w % Cu and 37 w % Zn) was placed in a vacuum (10 Pa) oven and heated for 6 hours at 500 C to produce the foam.

In one embodiment of the invention, a separator is employed between the electrodes. On one embodiment of the invention, a separator is employed between the anodic current collector and the anion exchange membrane. In one embodiment of the invention, a glass fiber separator is employed. Other separators, including but not limited to, e.g. polymer and/or celluose separators are possible according to the invention. In this way, the anion exchange membrane is in contact with the cathode, but not not in contact with metallic anode deposit (in the example case, the sodium deposit).

According to the example embodiment, the exemplary cell can tolerate some cross-over of $CuBF_4$ or $CuBH_4$ salts. In the described embodiment, a salt cross-over results in copper deposition on the anode. In other words the anodic copper electrode slowly gains mass, while the cathodic copper electrode slowly loses mass, but the overall battery operation remains essentially unhindered. Since, in the described embodiment, the electrode composition is symmetric in the discharge state, this electrode mass transfer may be even reversed by switching the battery's polarity.

Figure 6:
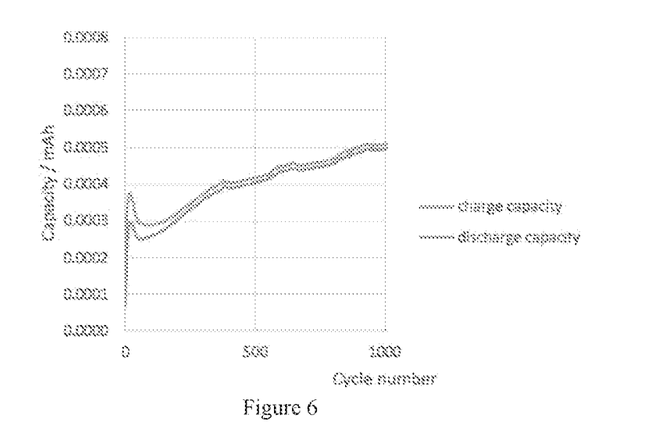
FIG. 6: Battery cycling data showing the validation of one embodiment of the electrochemical cell of the invention.

In a validation experiment, both electrodes were made from plain copper wire, and the cross-over of dissolved copper salts was prevented by a gravity-assisted gap. As shown in FIG. 6, the cell showed stable performance over 1000 cycles, with gradually increasing capacity. This capacity increase is ascribed to the gradual roughening of the copper wire surface.

The invention claimed is:

1. A discharge state assembled rechargeable electrochemical cell, which comprises:
   (a) only an electrically conductive anodic current collector as an anode when in discharged state;
   (b) a cathode that comprises only metallic material as an active material; and
   (c) an anion-exchange structure and an electrolyte, both situated between the anodic current collector and the cathode,
wherein a solid metallic deposit is formed on and/or in the anodic current collector during charging.

2. The electrochemical cell of claim 1, wherein the cathode is an essentially purely metallic cathode and/or, wherein the cathode comprises pure metal active material in a dispersion.

3. The electrochemical cell of claim 2, wherein the cathode is in contact with an electrically conductive cathodic current collector or, wherein all or part of the cathode also acts as an electrically conductive cathodic current collector.

4. The electrochemical cell of claim 1, wherein a salt is formed, at least in part, from the cathode during charging.

5. The electrochemical cell of claim 1, wherein the anodic current collector and cathode comprise the same material.

6. The electrochemical cell of claim 1, wherein the anodic current collector and/or cathode are doped.

7. The electrochemical cell of claim 1, wherein the anodic current collector and/or cathode comprise copper or doped copper.

8. The electrochemical cell of claim 6, wherein the cathode and/or anodic current collector comprise purely metallic copper or doped copper.

9. The electrochemical cell of claim 1, wherein the anodic current collector and/or cathode are doped with a dopant comprising zinc.

10. The electrochemical cell of claim 1, wherein the ion-exchange structure prevents transfer of cations contained in the metal salt formed at the cathode and/or which allows selective transport of alkali metal anions.

11. The electrochemical cell of claim 1, wherein the cathode and/or the anodic current collector are porous.

12. The electrochemical cell of claim 1, wherein the cathode and/or anodic current collector are made porous by evaporation of one or more elements from a metallic mixture and/or alloy.

13. The electrochemical cell of claim 1, wherein the polarity of the cell is reversable so that the cathode becomes the anodic current collector and the anodic current collector becomes the cathode.

14. The electrochemical cell of claim 1, wherein the cathode is porous and comprises only metallic material as the active material and a dopant.

15. A battery pack comprising the electrochemical cell of claim 1.

16. A device comprising the electrochemical cell of claim 1.

17. The electrochemical cell of claim 1, wherein the anode, cathode or anodic and/or cathodic current collector is a porous multi-component anode, cathode or anodic and/or cathodic current collector.

* * * * *